Feb. 22, 1927.
A. J. STEPHENS
BLOW-OUT PATCH
Filed Sept. 30, 1926
1,618,314
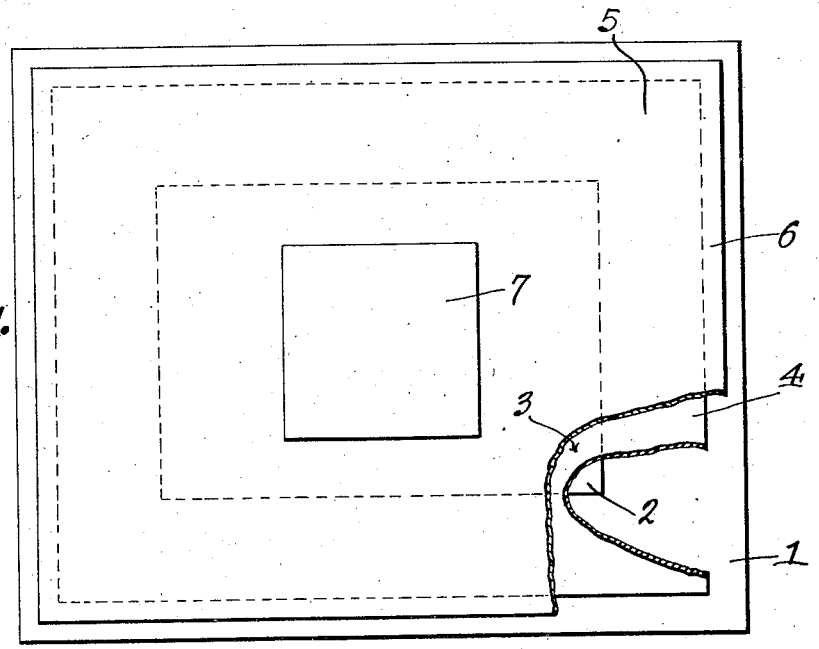
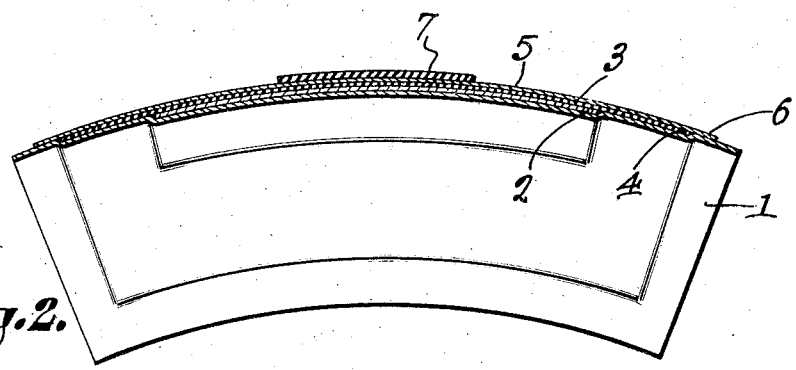
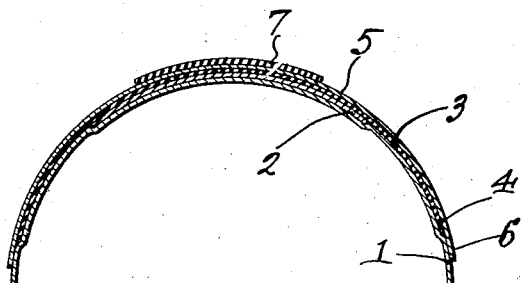
A. J. Stephens Inventor
By C. A. Snow & Co.
Attorneys Patented Feb. 22, 1927.

1,618,314

UNITED STATES PATENT OFFICE.

ANDREW J. STEPHENS, OF KANSAS CITY, MISSOURI.

BLOW-OUT PATCH.

Application filed September 30, 1926. Serial No. 138,671.

This invention aims to provide a blow-out patch so constructed that a piece of raw gum rubber may be made to shield a puncture or rupture in a tire casing, novel means being provided for preventing the heat from passing through the patch to the inner tube, the heat being confined about the raw rubber to aid in rendering the raw rubber efficient as a means for shielding the puncture or rupture.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in top plan and laid out flat, a blow-out patch constructed in accordance with the invention, parts being broken away;

Figure 2 is a longitudinal section of the patch in the form which it will assume when the patch is a tire casing; and Figure 3 is a transverse section.

The patch forming the subject matter of this application comprises an inner layer 1, made of canvas or any other suitable material. An intermediate layer 2 of rubberized fabric is secured to the inner layer 1. The intermediate layer 2 is of less area than the inner layer 1. An intermediate sheet 3 of asbestos and rubber compound is secured to the intermediate layer 2 and is of greater area than the intermediate layer 2, to form a bounding margin 4 which is secured directly to the inner layer 1. An outer layer 5 is secured to the intermediate sheet 3 and is of greater area than the intermediate sheet, to form a bounding margin 6 which is secured directly to the inner layer 1. A thin block 7 of raw gum rubber is secured to the exposed surface of the outer layer 1.

When the patch is placed in a tire, the heat due to the friction between the tire casing and the road will cause the block 7 of raw rubber to fill and seal the puncture or rupture. The sheet 3 may be referred to as a second intermediate sheet and since it is made of an asbestos compound, it functions as a heat insulating medium.

What is claimed is:—

A blow-out patch comprising an inner layer, an intermediate layer of rubberized fabric secured to the inner layer and of less area than the inner layer, a second intermediate sheet of asbestos and rubber compound secured to the intermediate layer and of greater area than the intermediate layer to form a bounding margin which is secured directly to the inner layer, an outer layer secured to the second intermediate sheet and of greater area than the second intermediate sheet, to form a bounding margin which is secured directly to the inner layer, and a thin block of raw gum rubber secured to the exposed surface of the outer layer.

In testimony that I claim the foregoing as my own, I have hereto affixed my signature.

ANDREW J. STEPHENS.